United States Patent
Jones

(10) Patent No.: US 7,341,298 B2
(45) Date of Patent: Mar. 11, 2008

(54) FIBERGLASS BODY WITH REINFORCING MEMBER

(75) Inventor: David A. Jones, West Middlesex, PA (US)

(73) Assignee: Jones Performance Products, Inc., West Middlesex, PA (US)

( * ) Notice: Subject to any disclaimer, the term of this patent is extended or adjusted under 35 U.S.C. 154(b) by 59 days.

(21) Appl. No.: 11/415,010

(22) Filed: May 1, 2006

(65) Prior Publication Data

US 2006/0249988 A1  Nov. 9, 2006

Related U.S. Application Data

(60) Provisional application No. 60/678,621, filed on May 6, 2005.

(51) Int. Cl.
*B62D 25/10* (2006.01)
*B62D 25/08* (2006.01)
*B62D 27/02* (2006.01)
*B62D 25/16* (2006.01)

(52) U.S. Cl. .................. 296/29; 296/198; 296/193.11; 296/901.01

(58) Field of Classification Search ................ 296/198, 296/193.11, 901.01, 29, 181.2
See application file for complete search history.

(56) References Cited

U.S. PATENT DOCUMENTS

| | | | | |
|---|---|---|---|---|
| 3,232,368 A | * | 2/1966 | Sullivan | 180/68.3 |
| 3,338,326 A | * | 8/1967 | Hafer et al. | 180/69.21 |
| 3,628,622 A | * | 12/1971 | Kiwitz | 180/69.21 |
| 6,279,756 B1 | * | 8/2001 | Walter et al. | 211/26 |
| 6,332,642 B1 | * | 12/2001 | Hanyu | 296/203.02 |
| 7,118,170 B2 | * | 10/2006 | Montanvert et al. | 296/209 |
| 7,240,753 B2 | * | 7/2007 | Ellerman | 180/69.2 |

* cited by examiner

*Primary Examiner*—Dennis H Pedder
(74) *Attorney, Agent, or Firm*—James R. Williams

(57) ABSTRACT

The present invention describes a reinforcing member that permits fiberglass pieces to be attached securely yet removably. The pieces can be simply and easily assembled and disassembled with common tools and with no specialized knowledge or ability. Unlike prior art, repairs do not necessarily involve sandblasting, gluing or laminating. The invention permits easy customization or replacement of pieces. The invention includes a reinforcing member having a box truss coupled with at least one gusset. One embodiment includes a truck hood having a center section and fenders. The hood has proven as durable and rigid as traditional unitary construction techniques.

21 Claims, 5 Drawing Sheets

FIBERGLASS BODY WITH REINFORCING MEMBER

The present invention claims priority to U.S. provisional application No. 60/678,621, filed May 6, 2005 which is hereby incorporated by reference.

FIELD OF THE INVENTION

The invention relates to a hood for a motor vehicle, and more specifically to a fiberglass truck hood including a plurality of separable pieces.

BACKGROUND OF THE INVENTION

Government regulations and the desire for improved fuel economy have forced motor vehicle manufacturers toward lighter weight materials. Hoods and fenders are no exception. The need for improved fuel economy has caused steel hoods to be replaced with lighter hoods comprising aluminum or fiberglass.

Fabrication of an aluminum hood requires stamping an aluminum panel using a press and a machined die. A plurality of panels may form pieces of the hood. One such hood includes left and right top sections, sides, fenders, and a grill. Manufacturers typically include additional bracing around the fender pieces to reduce fender shake and vibration. Vibration is distracting to drivers and can accelerate metal fatigue. Bracing adds to the weight of the hood.

In a metal hood, the grill often comprises steel and functions as a frame onto which the pieces are attached, directly or indirectly, using mechanical fasteners such as welds, rivets or bolts. A common bolt fastener includes a Huck® bolt. Replacement of a piece of the hood could be necessary because of damage or could be desirable for aesthetic reasons. Replacing the grill would obviously be difficult because it is the frame for the entire hood. Replacing other pieces would require removing the piece from the hood, such as with a saw and grinding tool, and attaching the new piece.

Unlike metal hoods, fiberglass hoods require no presses or dies. The absence of a press or die substantially reduces costs and time for a new design. Instead, a mold, which may be formed for example from wood or plastic, is typically used. A mold can be fabricated quickly and inexpensively. Resin-impregnated fiberglass is laid up over the mold and cured. The hood is commonly cured as a single unit, but a manufacturer could produce a plurality of pieces that are subsequently glued and laminated together. Additionally, fiberglass hoods do not rely on the grill as a structural member. The grill is easily removed or replaced. Greater aesthetic flexibility is possible with fiberglass as compared to aluminum.

Detracting from the use of fiberglass is the complexity of replacing portions of a one-piece hood. Fiberglass hoods generally lack the necessary strength to permit mechanical fastening of replacement portions. Although minor repairs can be easily made using patching compounds, repairing more substantial damage is difficult. Replacing or repairing a large portion of a fiberglass hood can be time-consuming, expensive, and likely requires professional attention. The old portion must first be removed, such as with a saw or grinding tool. The area of the hood to which the new portion is to be fixed must be sandblasted to create a clean, bondable surface. The new portion must be glued, laminated and cured to the hood. The vehicle is out of service during the duration of the repair, which could last several days.

Prior art does include a four-piece fiberglass hood comprising a center section, left and right fenders, and a metal grill. The center section includes flanges on its right and left sides. The flanges mate with a corresponding flange on the respective fender. The center flange and fender flange are secured together using a mechanical fastener, such as a rivet or bolt. Unfortunately, the flange assembly lacks mechanical strength. The unreinforced flange cannot accept a large, heavy fender, so fender options are limited. At speed, winds cause the fender to vibrate. Persistent vibration leads to mechanical fatigue and the formation of cracks in the hood assembly. Cracks ultimately lead to failure and fracture of the center section or fender.

A need exists for a hood that permits inexpensive and quick replacement of fiberglass hood pieces, particularly fenders, without the accompanying mechanical flaws of prior art. Preferably, the pieces could be of substantial weight and size, and could be modified to satisfy aesthetic preferences.

SUMMARY OF THE INVENTION

The present invention describes a hood comprising fiberglass that permits easy replacement of portions of the hood. In a broad aspect, the replacement portions can be simply and quickly removed with common tools and with no specialized knowledge or ability. Sandblasting, gluing or laminating is not necessary. Advantageously, the vehicle is also out of service for only a brief period of time.

The invention includes at least one reinforcing member along a junction of two pieces. The reinforcing member comprises a box truss and a plurality of reinforcing gussets. The gussets reinforce at least one edge of the box truss. A mechanical fastener passes through both pieces and is preferably placed near a gusset. Most preferably, the fastener is placed between a pair of gussets. The box truss resists torsional forces. The gussets resist twisting and reinforce the joint between the two pieces.

In one embodiment, the hood comprises a center section and left and right fenders. The center section includes a box truss that arcs around each wheel well. A plurality of gusset pairs extends on a side of the truss facing the wheel well. The fenders attach to the center section with a plurality of mechanical fasteners between each pair of gussets.

In a second embodiment, the hood includes left and right top sections. A reinforcing member is present on each section at the junction of the two sections. Mechanical fasteners join the pieces through the reinforcing members. Advantageously, the reinforcing members also act as a brace for the hood, thereby reducing vibration and increasing mechanical strength.

BREIF DESCRIPTION OF THE DRAWINGS

DETAILED DESCRIPTION OF THE INVENTION

The present invention permits large pieces of fiberglass to be fixedly secured using simple mechanical fasteners. Each piece includes a flange. The flanges meet at a junction. At least one flange comprises a reinforcing member that provides rigidity to the assembly and reinforcement at the mechanical junction. The reinforcing member comprises a box truss and gussets. The reinforcing member defines a plurality of holes. Each hole is adjacent to at least one gusset and will align with corresponding holes in the other flange. Preferably, the holes in the reinforcing member are positioned between a pair of gussets. The holes are adapted to receive mechanical fasteners, thereby securing the two pieces together. The gussets provide additional mass around the holes as well as limiting flex. The other piece may or may not have a reinforcing member depending on the stress along the junction and experienced by the pieces. One skilled in the art would determine the need for and location of a second reinforcing member depending on the size, weight and geometry of the pieces. A second reinforcing member is often necessary when the pieces are both large, such as, complimentary sides of a center section that are joined substantially along the centerline of a hood.

A particular embodiment of the invention includes a hood having a reinforcing member around each wheel well. A fender is secured to the wheel well by mechanical fasteners. Fenders are often small and light enough that a second reinforcing member is unnecessary. In fact, the structural integrity provided by the reinforcing member can permit the fenders to be lighter than typical fenders in fiberglass hoods comprising a unitary body. The hood may comprise a center section, a left fender and a right fender. The center section may comprise one or more pieces. The center section may be formed from a single molding of fiberglass or may be formed from two pieces of fiberglass, which are then united by conventional bonding or by using the reinforcing member of this invention. Forming the center section out of a single piece can reduce the need for bracing or a reinforcement member, thereby reducing the weight of the hood.

Figure 1:
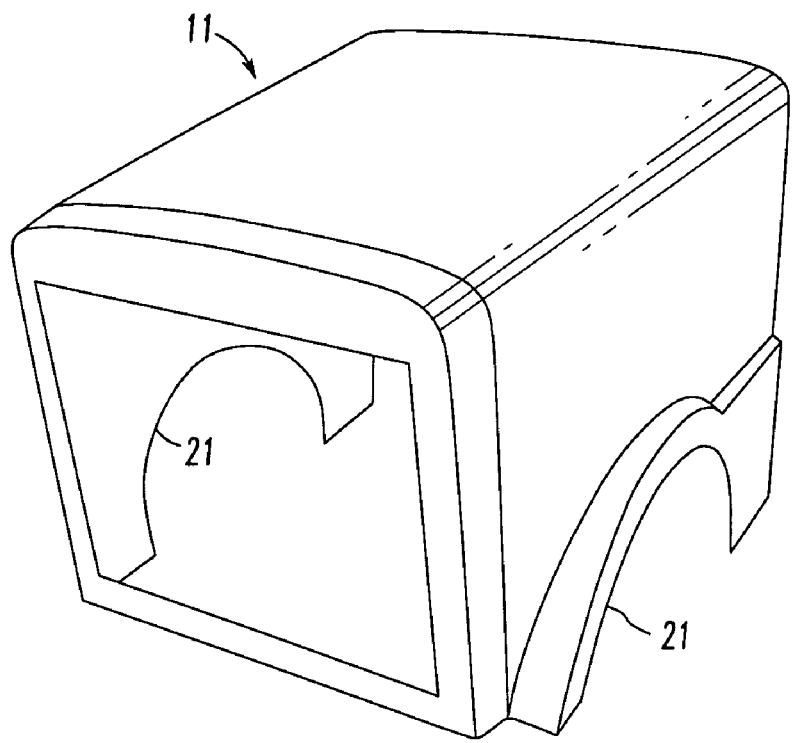
FIG. 1 shows an exterior side view of a center section of a truck hood.
Figure 2:
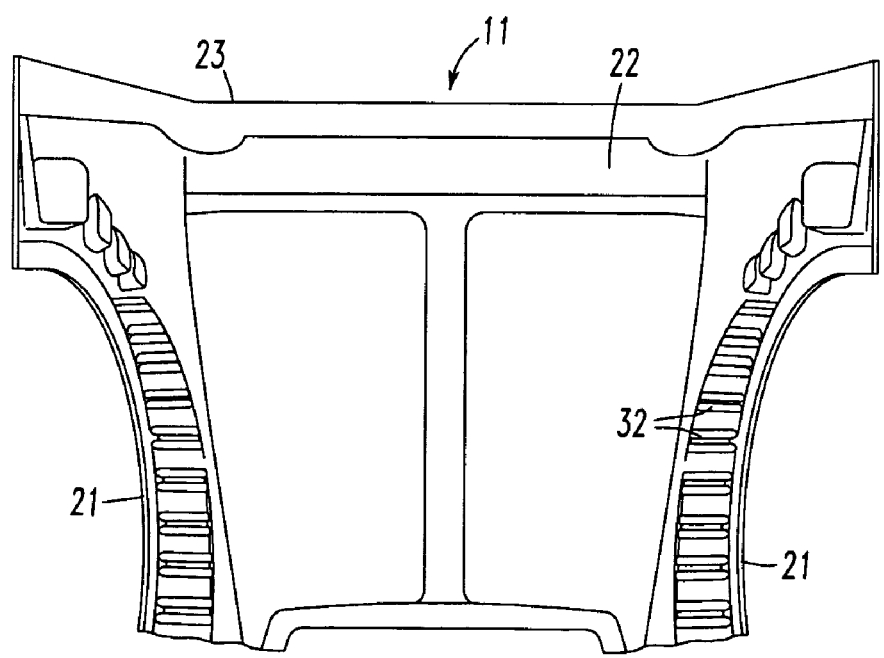
FIG. 2 shows a bottom view of the interior view of the center section a truck hood of the present invention.
Figure 6A:
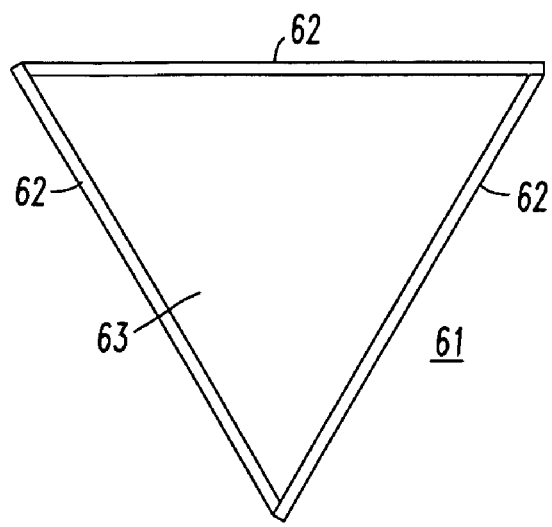
FIG. 6a shows a cross-section of a three-walled box truss.
Figure 6B:
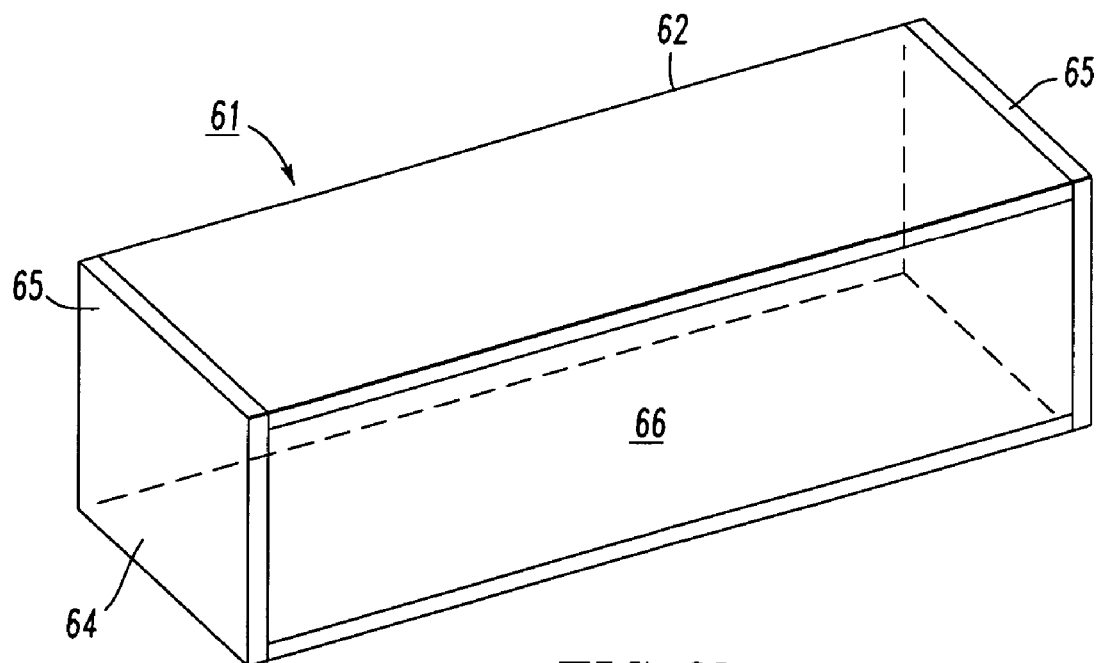
FIG. 6b shows a four-walled box truss.

FIG. 1 shows an outside side view of the center section 11 of the present invention without the fenders or grill attached. Neither the fenders nor grill is necessary for the structural integrity of the center section. FIG. 2 shows an underside view of the center section 11. The center section 11 includes left and right wheel wells 21 and, in this embodiment, a brace 22. The brace 22 increases mechanical rigidity. The brace 22 arcs along the rear perimeter 23 of the hood 11. The brace 22 may include a box truss and provides rigidity to the hood 11. As shown in FIG. 6a, a box truss 61 includes at least three sides 62. The sides 62 are combined to form an interior space 63. FIG. 6b shows box truss 61 including four sides 62 and having a rectangular cross-section. End caps 64 may close the ends 65 to create an interior volume 66.

Figure 3:
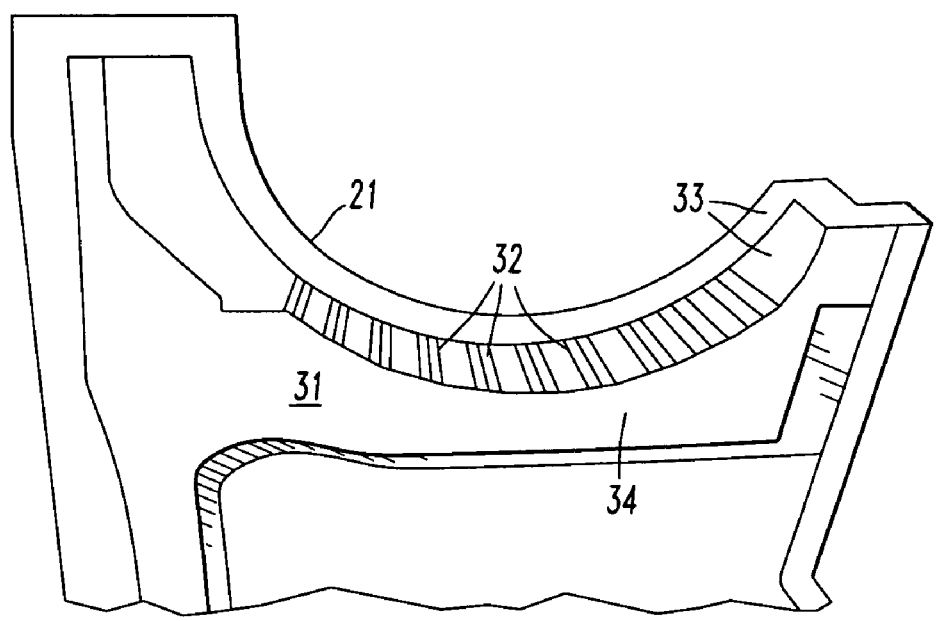
FIG. 3 shows a side view of the wheel well of FIG. 2.
Figure 4:
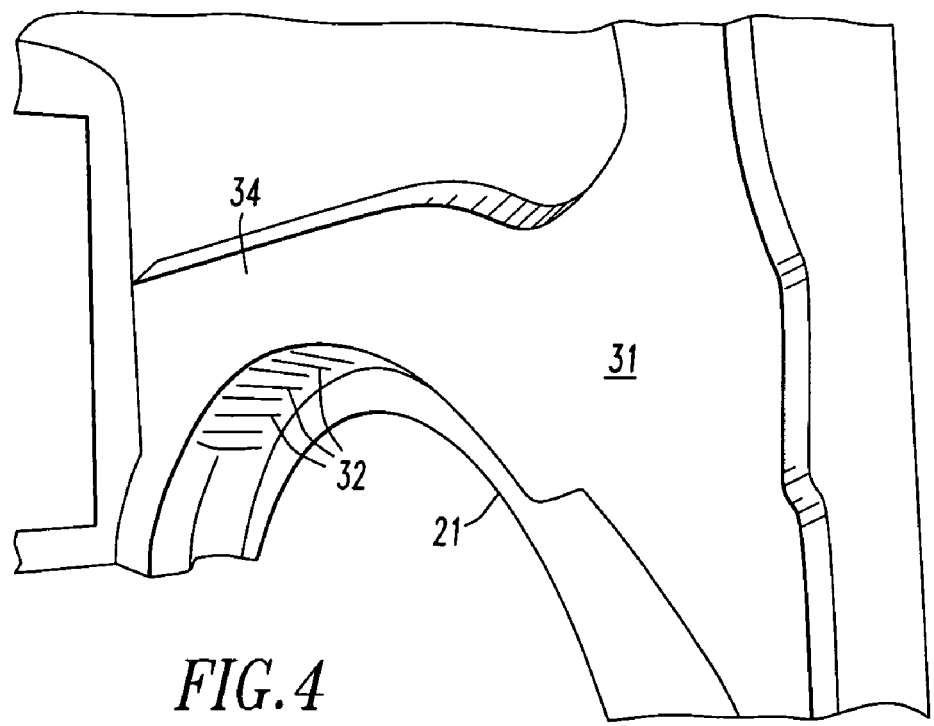
FIG. 4 shows a rear view of the wheel well of FIG. 2.
Figure 5:
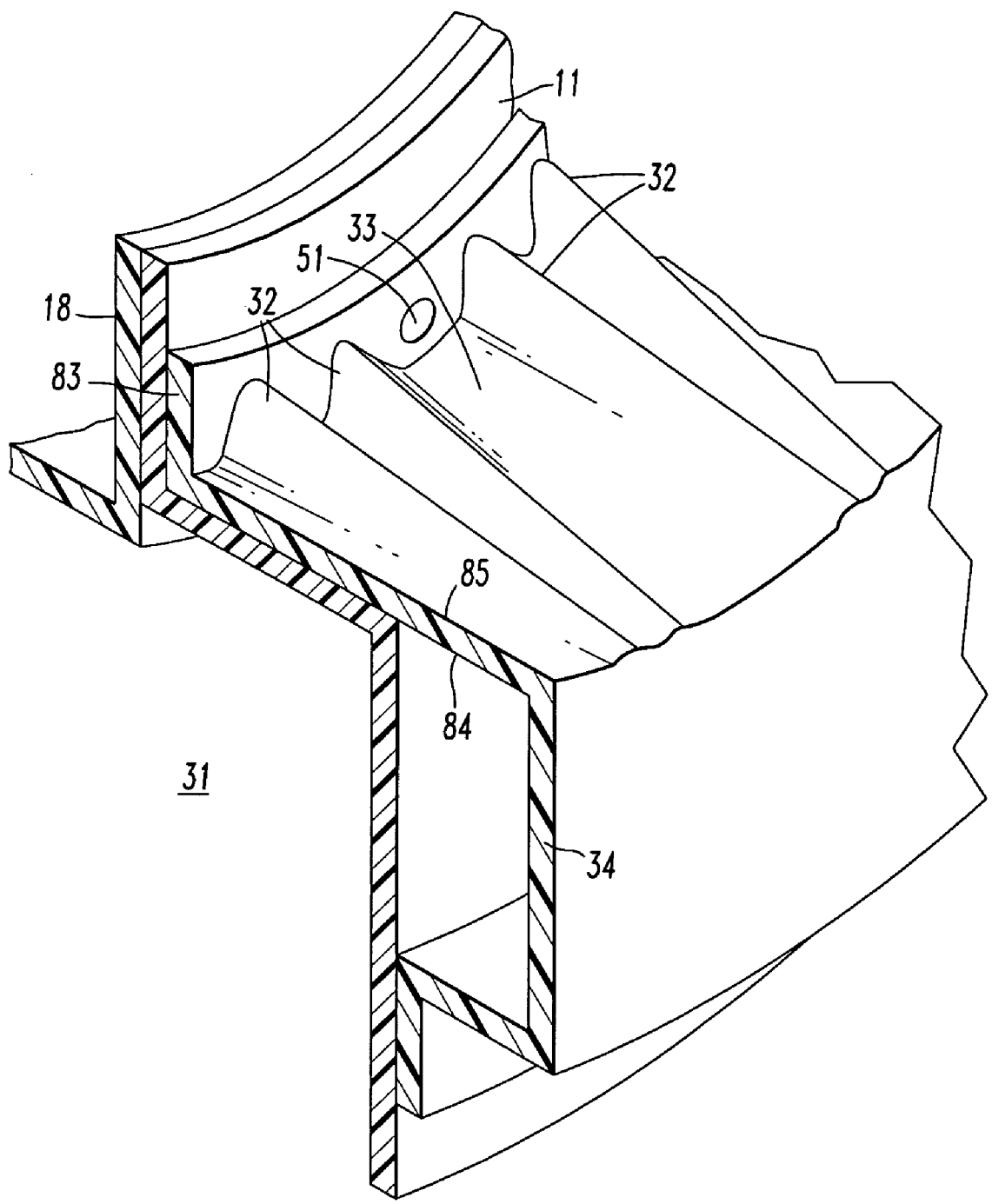
FIG. 5 shows a close-up of the gussets of FIG. 2.

A reinforcing member 31 follows the perimeter of the wheel wells 21, as shown in FIGS. 3 and 4. Notably, the rigidity of the reinforcing members may, in some circumstances, permit elimination of the brace. Elimination of the brace lowers manufacturing costs and reduces the weight of the hood. The reinforcing member 31 also includes a box truss 34, but unlike the brace 22, the box truss 34 of the reinforcing member 31 has a plurality of gussets 32 along at least a side 33 of the member 31 facing the wheel well 21. The gussets 32 extend from the wheel well 21 at least partially up the side 33 of the box truss 34. The gussets 32 reinforce the side 33 and resist bending forces. FIG. 5 shows a close-up of the gussets 32 along the wheel well 21. At least one hole 51 for the mechanical fastener is present. The gussets in the embodiment of FIGS. 3-5 are paired; however, gussets may be distributed singly. Gussets may be at any angle to the side, but gussets preferably are orthogonal or nearly orthogonal to the sides. Gussets have a cross-section of any convenient shape. Preferably, gussets should have a continuous cross-section without areas of stress concentration. Stress concentrators include, for example, discontinuities in the design such as steps, corners and points. Conveniently, gussets have a U-shaped cross-section, which facilitates manufacture and reduces stress concentrators. The cross-section may change along the length of the gusset but, preferably, is greatest at the wheel well.

Figure 7:
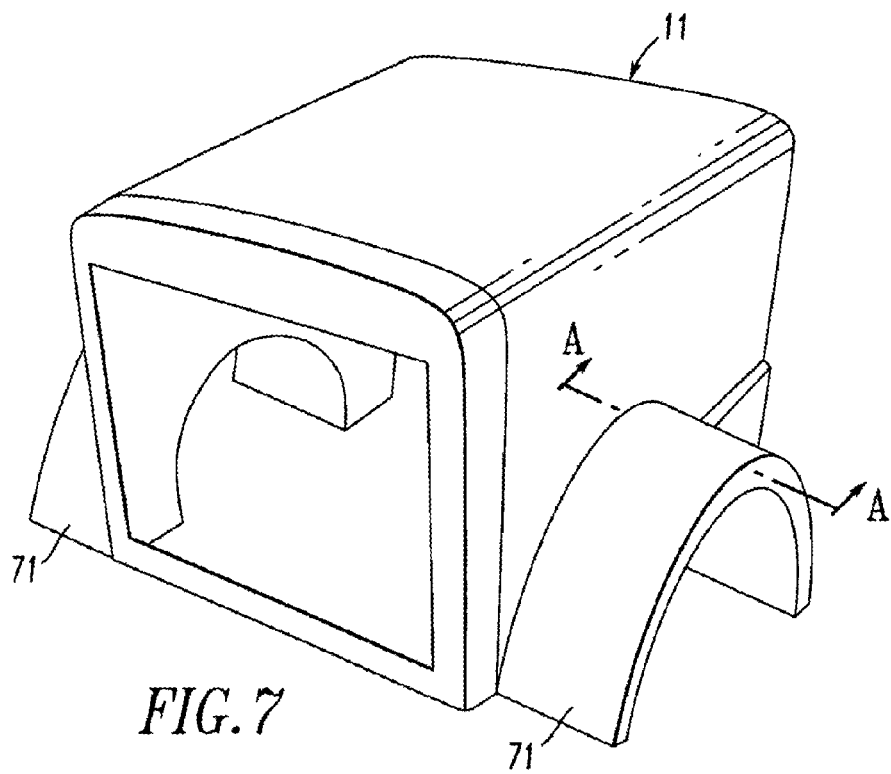
FIG. 7 shows a center section and fender.
Figure 8:
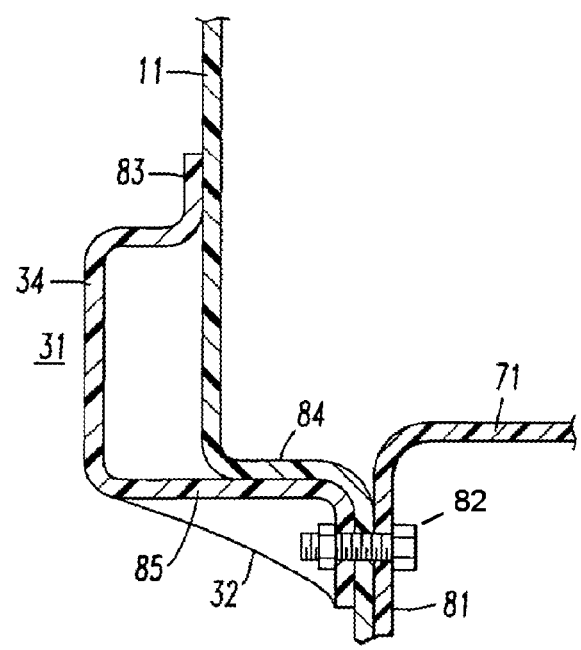
FIG. 8 shows a cross-section of FIG. 7 along A-A.

FIG. 7 shows a fender 71 fastened to a center section 11. The intersection of the two pieces is preferably substantially along a plane. FIG. 8 shows a cross-section of the intersection along plane A-A. The center section 11 includes a reinforcing member 31 comprising a box truss 34 and gussets 32. The box truss 34 may be molded as a unitary body with the center section 11, but is more typically formed as a separate piece and bonded to the center section. Bonding may be mechanical or chemical such as, for example, glue or lamination. Bonding should occur along a sufficiently large area to keep stress and strain within material tolerances. To this end, a top extension 83 of the reinforcing member 31 may bond to the center section 11, and a lower extension 85 of the reinforcing member 31 may bond to a protrusion 84 of the center section 11. The anticipated stress on the intersection will dictate the required length of the extensions.

In this embodiment, the fender 71 includes a flange 81 without a reinforcing member. The fender 71 and center section 11 are secured together using at least one mechanical fastener 82. The number of fasteners will depend on the size, weight and geometry of the pieces. Fasteners are preferably distributed along the entire contact surface of the center section and fender. The fastener may be any type of fastener, such as a bolt and nut, a rivet, screw, etc. The fastener is preferably removable with common tools to facilitate assembly and disassembly of the pieces. The layers of lower extension 85, protrusion 84 and flange 81 produce an intersection with substantial strength.

EXAMPLE 1

A three-piece fiberglass hood of the present invention was made consisting of a center section, a left fender and a right fender. The center section included reinforcing members around each wheel well. The fenders had no reinforcing member and were secured to the center section with mechanical fasteners, specifically bolts, washers and lock nuts. A metal grill was fitted to the fiberglass hood. A commercially available aluminum hood of similar shape comprising a plurality of pieces was used as a control. The fiberglass and aluminum hoods were installed on similar commercial vehicles performing similar work. Durability was assessed at a predetermined time. Metal fatigue on the fenders of the aluminum hood was observable, apparently because of shaking during operation. No shaking was observed during operation of the fiberglass hood, and no fatigue or cracking was identified. The fiberglass fenders remained securely fixed to the center section.

EXAMPLE 2

A three-piece fiberglass hood of the present invention was made consisting of a center section, a left fender and a right fender. A metal grill was fixed to the hood. The center section included reinforcing members around each wheel well. The fenders had no reinforcing member and were secured to the center section with mechanical fasteners. The hood was installed on a commercial dump truck for a period of six months. The truck was in service five days per week and averaged eleven loads and unloads each day. After the test period, the hood was removed and inspected. No signs of fatigue or cracking were found.

EXAMPLE 3

A four-piece hood of the present invention is made comprising left and right top sections, and left and right fenders. Each top section includes a flange along a centerline of the hood, a rear brace comprising a reinforcing member, and a reinforcing member around a wheel well. A simple flange is often sufficient along the centerline of a hood because stress is low. In contrast, stress can be high at the rear of the hood so a reinforcing member should be used in this location. The top sections are secured through their flanges and reinforcing members with bolts, washers and lock nuts. The rigidity imparted to the center by the reinforcing member of the rear brace can eliminate the need for additional bracing in the center section. The fenders are secured to the center section using mechanical fasteners. The rigidity of the reinforcing member surrounding the wheel well eliminates the need for reinforcing members on the fenders and permits the fenders to be lighter than otherwise possible. Conveniently, damage to any one section of the hood can be repaired by unbolting the piece and replacing with a new piece.

Obviously, numerous modifications and variations of the present invention are possible. It is, therefore, to be understood that within the scope of the following claims, the invention may be practiced otherwise than as specifically described. While this invention has been described with respect to certain preferred embodiments, different variations, modifications, and additions to the invention will become evident to persons of ordinary skill in the art. All such modifications, variations, and additions are intended to be encompassed within the scope of this patent.

What is claimed:

1. A fiberglass body comprising a first piece and a second piece joined at a junction, the first piece comprising fiberglass and including a reinforcing member along at least a portion of the junction, the reinforcing member comprising a box truss having a side and at least one reinforcing gusset substantially coextensive with and bracing the side, the first and second pieces secured by at least one mechanical fastener.

2. The fiberglass body of claim 1, wherein the second piece includes a reinforcing member along at least a portion of the junction.

3. The fiberglass body of claim 1, wherein the mechanical fastener passes through the second piece and the reinforcing member of the first piece.

4. The fiberglass body of claim 1, wherein the first piece is a center section of a vehicle hood and the second piece is a fender.

5. The fiberglass body of claim 1, wherein the first piece comprises a left top section of a vehicle hood and the second piece comprises a right top section of the vehicle hood.

6. The fiberglass body of claim 1, wherein the box truss of the reinforcing member includes four sides.

7. The fiberglass body of claim 1, wherein the fiberglass body includes a plurality of gussets.

8. The fiberglass body of claim 1, wherein the fiberglass body includes a plurality of mechanical fasteners dispersed along the junction.

9. The fiberglass body of claim 1, wherein the mechanical fastener is located between a pair of gussets.

10. The fiberglass body of claim 1, wherein the mechanical fastener is selected from a group consisting of bolts, screws and rivets.

11. A fiberglass body comprising a reinforcing member along at least a portion of a flange, the reinforcing member comprising fiberglass and including a box truss having a side with a reinforcing gusset substantially coextensive with and bracing the side, the reinforcing member defining at least one hole adjacent to the gusset for receiving a mechanical fastener.

12. The fiberglass body of claim 11, wherein the box truss of the reinforcing member includes four sides.

13. The fiberglass body of claim 11, wherein the gusset is substantially orthogonal to the flange.

14. The fiberglass body of claim 11, wherein the gusset includes a continuous cross-section.

15. The fiberglass body of claim 14, wherein the cross-section is U-shaped.

16. The fiberglass body of claim 11, wherein the reinforcing member includes a plurality of gussets.

17. The fiberglass body of claim 16, wherein the gussets are paired.

18. A fiberglass vehicle hood comprising a center section and a fender joined at a junction, the center section comprising fiberglass and including a reinforcing member along at least a portion of the junction, the reinforcing member comprising a box truss having four sides and a plurality of reinforcing gussets substantially coextensive with and bracing at least one side, the center section and fender secured by a plurality of mechanical fasteners each adjacent to at least one gusset and passing through the fender and the reinforcing member of the center piece.

19. The fiberglass body of claim 18, wherein the fender includes a reinforcing member along at least a portion of the junction.

20. The fiberglass body of claim 18, wherein the mechanical fastener is located between a pair of gussets.

21. The fiberglass body of claim 18, wherein the mechanical fastener is selected from a group consisting of bolts, screws and rivets.

* * * * *